United States Patent [19]
Phillips

[11] Patent Number: 5,454,297
[45] Date of Patent: Oct. 3, 1995

[54] DEEP FRYER WITH DUAL CONVEYORS

[76] Inventor: James L. Phillips, 4824 E. McKenzie, Fresno, Calif. 93727

[21] Appl. No.: 223,016

[22] Filed: Apr. 5, 1994

[51] Int. Cl.$^6$ .................................................. A47J 37/12
[52] U.S. Cl. ................................................. 99/405; 99/407
[58] Field of Search ................................ 99/339, 403–407, 99/452–455, 386, 443 C

[56] References Cited

U.S. PATENT DOCUMENTS

| | | | |
|---|---|---|---|
| 1,598,435 | 8/1926 | Gottschalk | 99/405 |
| 1,625,070 | 4/1927 | Bailey | 99/405 |
| 1,686,596 | 10/1928 | Betz | 99/405 |
| 2,549,283 | 4/1951 | Ashton | 99/405 |
| 3,234,869 | 2/1966 | Porambo | 99/405 |
| 3,316,833 | 5/1967 | Williams et al. | 99/404 |
| 3,736,862 | 6/1973 | Crommelijnck | 99/353 |
| 4,189,994 | 2/1980 | Schmader | 99/354 |
| 4,706,557 | 11/1987 | Feng et al. | 99/355 |
| 5,322,006 | 6/1994 | Morioka et al. | 99/407 |

Primary Examiner—Timothy F. Simone

[57] ABSTRACT

An automatic conveyor deep fryer comprising a rectangular container with an input side, an output side, two side walls, and a bottom wall. A hot cooking liquid is positioned within the rectangular container. A conveyor assembly is positioned within the rectangular container. The conveyor assembly includes a primary conveyor and a secondary conveyor, the primary convey for having an input end, an output end, and an intermediate extent therebetween. A first driving sprocket is positioned at the input end of the primary conveyor, the first driving sprocket functioning to drive the input end of the conveyor. A second driving sprocket is positioned at the output end of the primary conveyor, the second driving sprocket functioning to drive the output end of the primary conveyor. The intermediate extent of the primary conveyor extends into the hot cooking liquid. The secondary conveyor has a receiving end and a dispensing end. The receiving end of the secondary conveyor is positioned adjacent to the output end of the primary conveyor. The secondary conveyor functions to receive food items from the primary conveyor.

1 Claim, 4 Drawing Sheets

DEEP FRYER WITH DUAL CONVEYORS

BACKGROUND OF THE INVENTION

Field of the Invention

The present invention relates to a deep fryer with dual conveyors and more particularly pertains to deep frying foods continuously and automatically with a dual conveyor assembly.

Description of the Prior Art

The use of deep fat fryers is known in the prior art. More specifically deep fat fryers heretofore devised and utilized for the purpose of frying foods in a container of hot fat are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,826,184 to Shotten Jr. discloses a conveyor-type cooking device.

U.S. Pat. No. 4,478,140 to Bullock discloses a fryer with oil circulation and conveyor.

U.S. Pat. No. 5,065,670 to Leiweke discloses a conveyor for dougnut fryer.

U.S. Pat. No. 5,074,199 to Miller discloses a deep fat fryer witch upwardly and downwardly movable conveyor and heating apparatus.

U.S. Pat. No. 4,379,055 to Carlson discloses an apparatus for the drip dry conveyance of oil-fried dough products.

In thins respect, the deep fryer with dual conveyors according to the present invention substantially departs from the conventional concepts and designs of the prior art, and in doing so provides an apparatus primarily developed for the purpose of deep frying food continuously and automatically with dual conveyor assembly.

Therefore, it can be appreciated that there exists a continuing need for a new and improved deep fryer with dual conveyors which can be used for deep frying foods continuously and automatically with dual conveyor assembly. In this regard, the present invention substantially fulfills this need.

SUMMARY OF THE INVENTION

In view of the foregoing disadvantages inherent in the known types of deep fat fryers now present in the prior art, the present invention provides an improved deep fryer with dual conveyors. As such, the general purpose of the present invention, which Will be described subsequently in greater detail, is to provide a new and improved deep fryer with dual conveyors and method which has all the advantages of the prior art and none of the disadvantages.

To attain this, the present invention essentially comprises an automatic conveyor deep fryer comprising a rectangular container with an input side, an output side, two side walls, and a bottom wall. Hot cooking liquid is positioned within the rectangular container. A conveyor assembly is positioned within the rectangular container. The conveyor assembly includes a primary conveyor and a secondary conveyor. The primary conveyor has an input end, an output end, and an intermediate extent therebetween, a first driving sprocket positioned at the input end of the primary conveyor. The first driving sprocket functions to drive the input end of the primary conveyor. A second driving sprocket is positioned at the output end of the primary conveyor, the second driving sprocket functioning to drive the output end of the primary conveyor. The intermediate extent of the primary conveyor extends into the hot cooking liquid. The secondary conveyor has a receiving end and a dispensing end, the receiving end of the secondary conveyor positioned adjacent to the output end of the primary conveyor. The secondary conveyor functions to receive food items from the primary conveyor. A drive means includes a motor, the motor serving to drive the first and second driving sprockets and the primary conveyor. The motor also serves to drive the secondary conveyor. A heating element is positioned under the bottom wall of the rectangular container, the heating element functioning to control the temperature of the hot cooking liquid. A lid is hingedly attached to one of the side walls of the rectangular container. A plastic food warmer is secured adjacent the dispensing end of the secondary conveyor, the plastic food warmer functioning to temporarily store cooked food items. An input tray is secured adjacent the input end of the primary conveyor, the input tray functioning to hold pots and canisters that contain food items and condiments. A control means is positioned under the bottom all of the rectangular container and adjacent the heating element, the control means functioning to control the drive means and heating element.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and system is for carrying out the several purposes of the present invention. It is important, therefore, that the claims be regarded as including such equivalent constructions insofar as they do not depart from the spirit and scope of the present invention.

Further the purpose of the foregoing abstract is to enable the U.S. Patent and Trademark office and the public generally, and especially the scientists, engineers and practitioners in he art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any Way.

It is therefore an object of the present invention to provide a new and improved deep fryer with dual conveyors which have all the advantages of the prior art deep fat fryers and none of the disadvantages.

It is another object of the present invention to provide a new and improved deep fryer with dual conveyors which may be easily and efficiently manufactured and marketed.

It is further object of the present invention to provide a new and improved deep fryer with dual conveyors which are of durable and reliable constructions.

An even further object of the present invention is to provide a new and improved deep fryer with dual conveyors which are susceptible of a low cost of manufacture with regard to both materials and labor, and which accordingly are then susceptible of low prices of sale to the consuming public, thereby making such deep fryer with dual conveyors economically available to the buying public.

Still yet another object of the present invention is to provide a new and improved deep fryer with dual conveyors which provide in the apparatuses and methods of the prior art some of the advantages thereof, while simultaneously overcoming some of the disadvantages normally associated therewith.

Even still another object of the present invention is to deep fry foods continuously and automatically with a dual conveyor assembly.

Lastly, it is an object of the present invention to provide a new and improved automatic conveyor deep fryer comprising, in combination, a rectangular container with an input side, an output side, two side walls, and a bottom wall. A hot cooking liquid is positioned within the rectangular container. A conveyor assembly is positioned within the rectangular container. The conveyor assembly includes a primary conveyor and a secondary conveyor, the primary conveyor having an input end, an output end, and an intermediate extent therebetween. A first driving sprocket is positioned at the input end of the primary conveyor, the first driving Sprocket functioning to drive the input end of the conveyor. A second driving sprocket is positioned at the output end of the primary conveyor, the second driving sprocket functioning to drive the output end of the primary conveyor. The intermediate extent of the primary conveyor extends into the hot cooking liquid. The secondary conveyor has a receiving end and a dispensing end. The receiving end of the secondary conveyor is positioned adjacent to the output end of the primary conveyor. The secondary conveyor functions to receive food items from the primary conveyor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
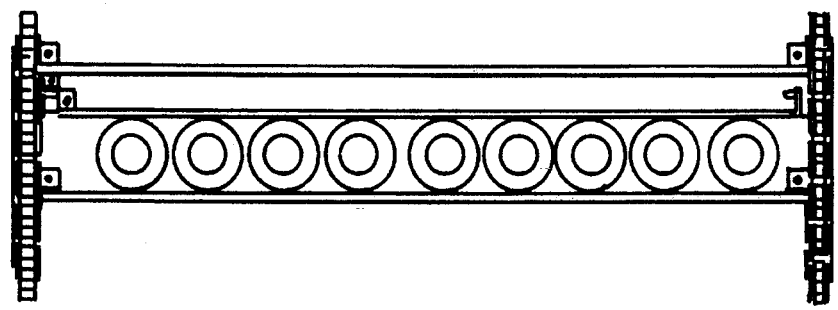
FIG. 1 is a top plan view of a prior art conveyor for doughnut fryer.
Figure 2:
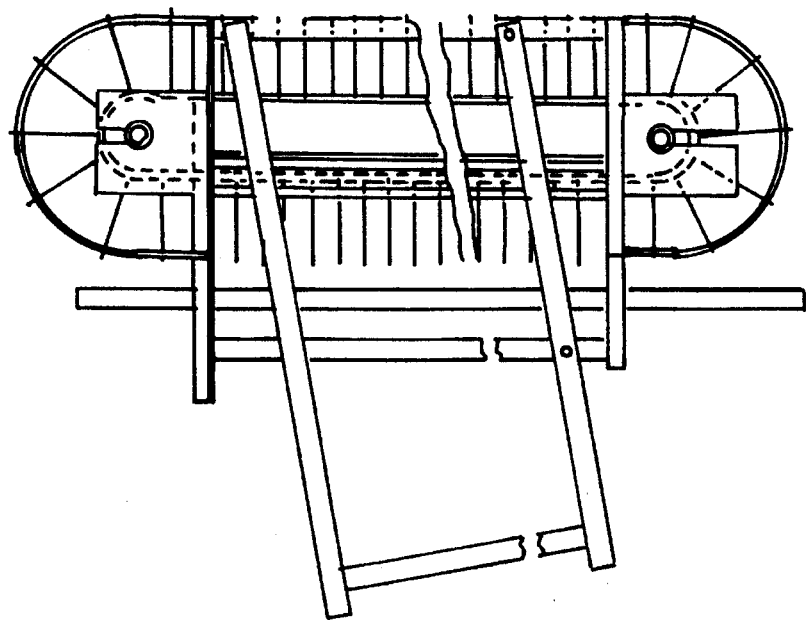
FIG. 2 is a side elevational view of a prior art apparatus for the drip dry conveyance of oil-fried dough products.
Figure 3:
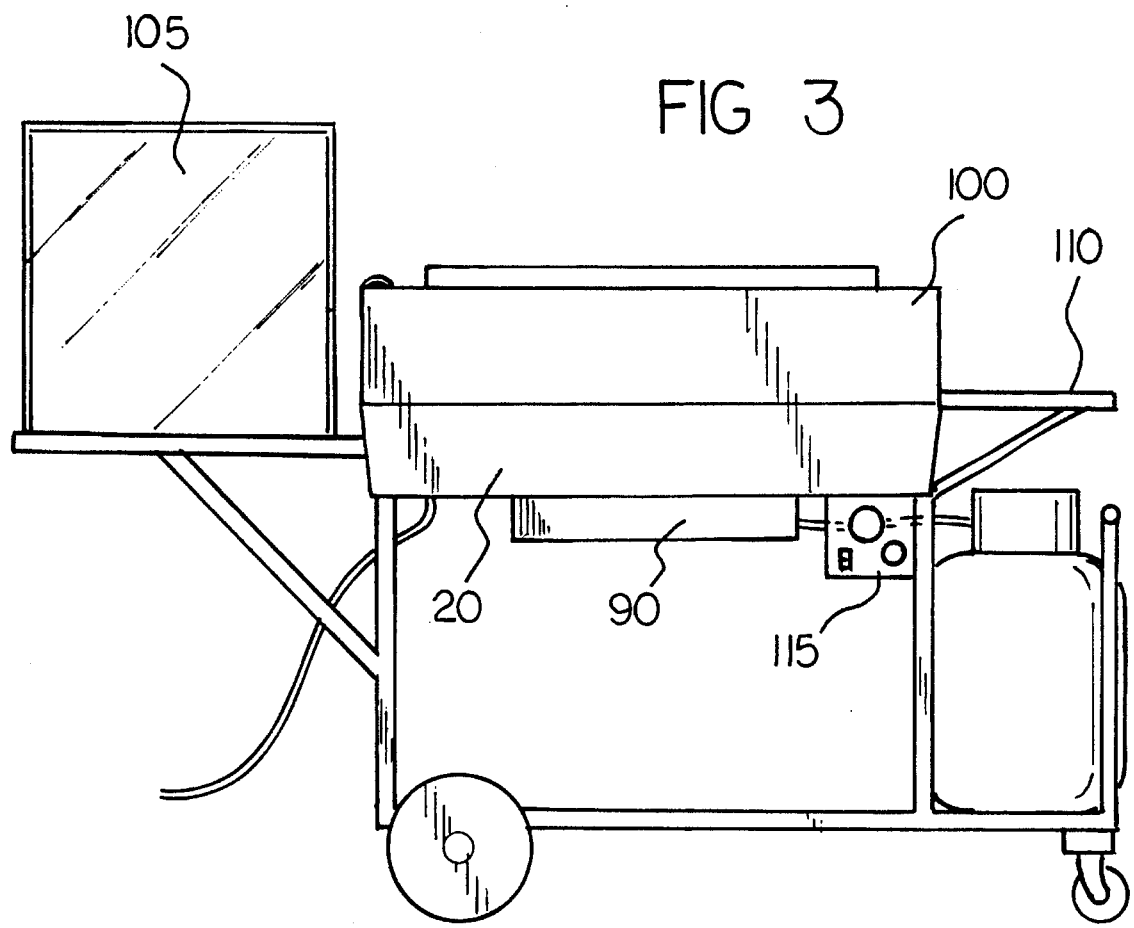
FIG. 3 is a side view of the preferred embodiment of a deep fryer with dual conveyors constructed in accordance with the principles of the present invention.
Figure 4:
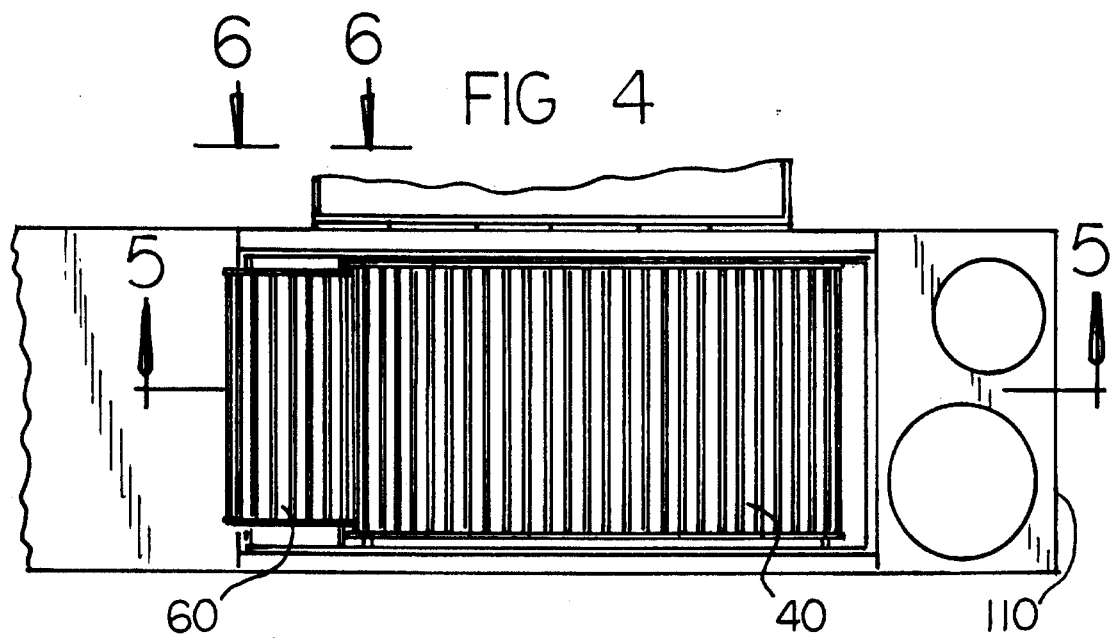
FIG. 4 is a top plan view of the device illustrated in FIG. 3.
Figure 5:
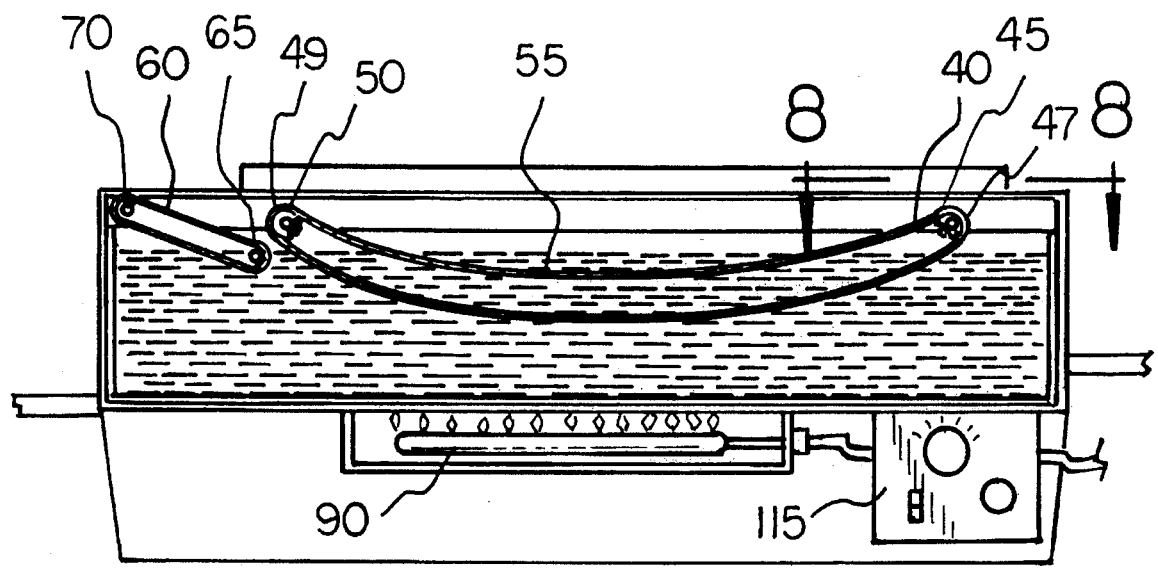
FIG. 5 is a cross-sectional view of the present invention taken along line 5—5 of FIG. 4.
Figure 6:
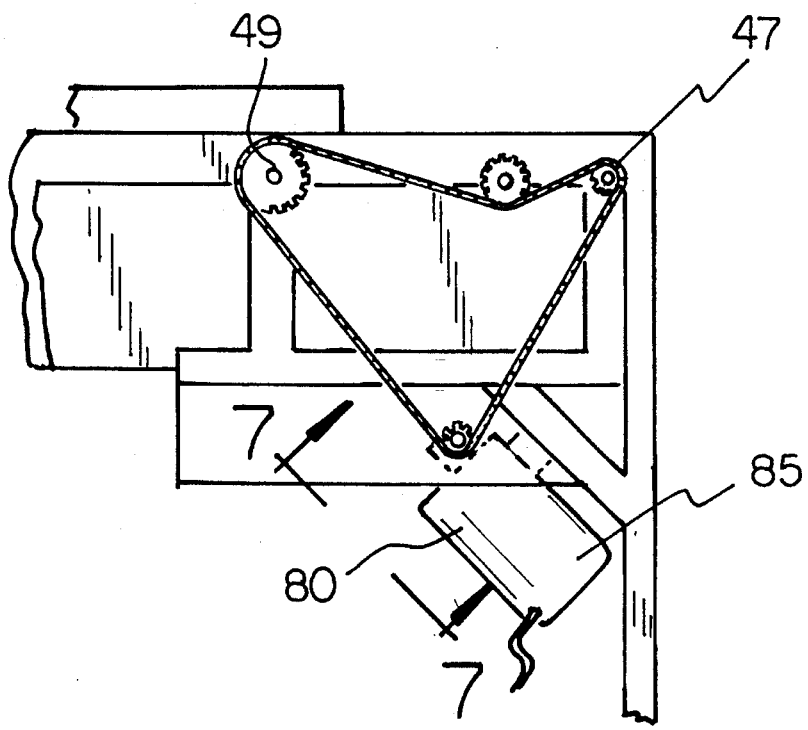
FIG. 6 is a cross-sectional view taken along line 6—6 of FIG. 4.
Figure 7:
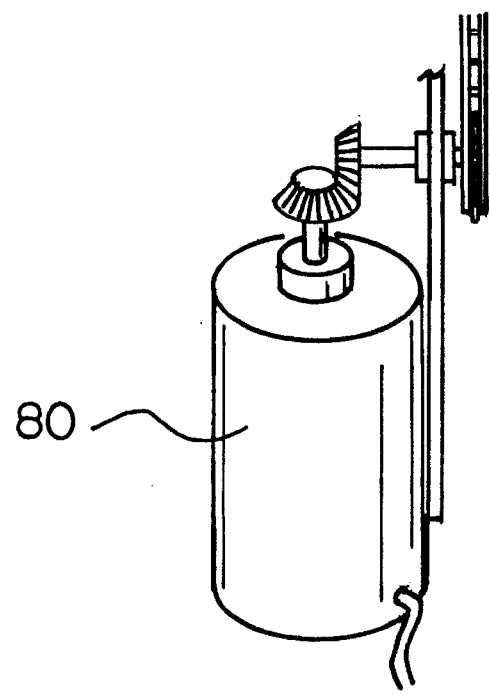
FIG. 7 is a cross-sectional view taken along line 7—7 of FIG. 6.
Figure 8:
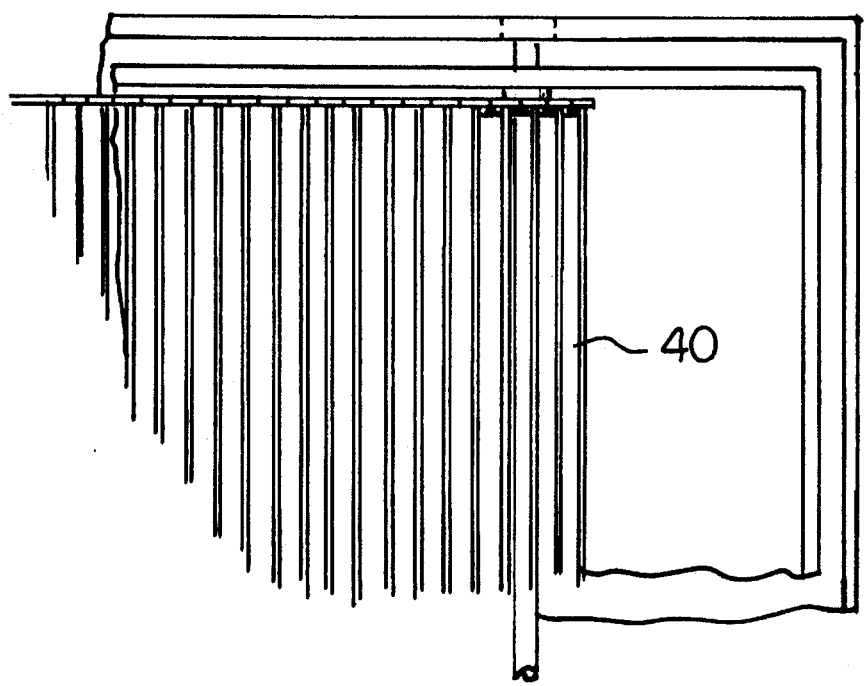
FIG. 8 is a cross-sectional view taken along line 8—8 of FIG. 5.

With reference now to the drawings, and in particular to FIG. 3 thereof, the preferred embodiment of the new and improved deep fryer with dual conveyors embodying the principles and concepts of the present invention and generally designated by the reference numeral 10 will be described.

The present invention relates to a device 10 for frying food. In its broadest context, the device 10 includes a rectangular container 20, hot cooking liquid 25, a primary conveyor 40, a secondary conveyor 60, a drive means 80, a heating element 90, a lid 100, a food warmer 105, an input tray 110, and a control means 115. The process of which is to deep fry foods continuously for immediate consumption at an ideal temperature.

The rectangular container 20 is large enough to encase both the primary conveyor 40 and the secondary conveyor 60. The rectangular container 20 is comprised of an input side and an output side and to side walls and a bottom wall to contain the hot cooking liquid 25.

The conveyor assembly is positioned within the rectangular container 20, the conveyor assembly includes a primary conveyor 40 and a secondary conveyor 60. The primary conveyor 40 has an input end 45, an output end 50, and an intermediate extent 55 therebetween. A first driving sprocket 47 is positioned at the input end 45 of the primary conveyor 40. The first driving sprocket 47 drives the input end 45 of the primary conveyor 40. A second driving sprocket 49 is positioned at the output end 50 of the primary conveyor 40. The second driving sprocket 49 drives the output end 50 of the primary conveyor 40. The intermediate extent 55 of the primary conveyor 40 extends into the hot cooking liquid 25.

The secondary conveyor 60 has a receiving end 65 and a dispensing end 70. The receiving end 65 of the secondary conveyor 60 is positioned adjacent to and beneath the output end 50 of the primary conveyor 40. The secondary conveyor 60 receives food items from the primary conveyor 40 and delivers it to exterior of the container 20.

The drive means 80 includes a motor 85. The motor 85 serves to drive the first and second driving sprockets 47 and 49 as well as the primary conveyor 40. The motor 85 also serves to drive the secondary conveyor 60.

The heating element 90 is positioned under the bottom wall of the rectangular container 20. The heating element 90 functions to control the temperature of the hot cooking liquid 25.

The lid 100 is hingedly attached to one of the side walls of the rectangular container 20.

The plastic food warmer 105 is secured adjacent the dispensing end 70 of the secondary conveyor 60. The plastic food warmer 105 functions to temporarily store cooked food items and to retain the heat therein.

The input tray 110 is secured adjacent the input end 45 of the primary conveyor 40. The input tray 110 holds pots and canisters that contain food items and condiments. Apertures in the tray allow canisters to be held therein.

The control means 115 is positioned under the bottom wall of the rectangular container 20 adjacent the heating element 90. The control means 115 controls the drive means 80 and heating element 90. The heating element may be of any variety including gas, electric, even charcoal, etc.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and Operation shown and described, and accordingly, all suitable modifications and equivalents may be resorted to, falling within the scope of the invention.

What is claimed as being new and desired to be protected by LETTERS PATENT of the United States is as follows:

1. A new and improved automatic conveyor deep fryer comprising, in combination:

a rectangular container with an input side, an output side, two side walls, and a bottom wall;

a hot cooking liquid positioned within the rectangular container;

a conveyor assembly positioned within the rectangular container, the conveyor assembly including a primary conveyor and a secondary conveyor, the primary conveyor having an input end, an output end, and an intermediate upper extent therebetween, a first driving sprocket positioned at the input end of the primary conveyor, the first driving sprocket functioning to drive the input end of the primary conveyor, a second driving sprocket positioned at the output end of the primary conveyor, the second driving sprocket functioning to drive the output end of the primary conveyor, the intermediate upper extent of the primary conveyor extending into the hot cooking liquid, the secondary conveyor having a receiving end and a dispensing end and an intermediate upper extent therebetween, the receiving end of the secondary conveyor positioned adjacent to the output end of the primary conveyor, the secondary conveyor functioning to receive food items from the primary conveyor;

a drive means including a motor, the motor serving to drive the first and second driving sprockets and the primary conveyor, the motor also serving to drive the secondary conveyor with the intermediate upper extent of the primary conveyer and the intermediate upper extent of the secondary conveyer being driven in the same feeding direction a heating element positioned under the bottom wall of the rectangular container, the heating element functioning to control the temperature of the hot cooking liquid;

a lid hingedly attached to one of the side walls of the rectangular container;

a plastic food warmer secured adjacent the dispensing end of the secondary conveyor, the plastic food warmer functioning to temporarily store cooked food items;

an input tray secured adjacent the input end of the primary conveyor,he input tray functioning to hold pots and canisters that contain food items and condiments; and a control means positioned under the bottom wall of the rectangular container and adjacent the heating element, the control means functioning to control the drive means and heating element.

* * * * *